(12) United States Patent
Shiau (10) Patent No.: US 11,747,699 B1
(45) Date of Patent: Sep. 5, 2023

(54) ELECTRONIC PAPER CARRIER AND IMAGE UPDATE MACHINE

(71) Applicant: Wistron Corporation, New Taipei (TW)

(72) Inventor: Yi-Hau Shiau, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/938,903

(22) Filed: Sep. 6, 2022

(30) Foreign Application Priority Data

Jul. 19, 2022 (TW) .................................. 111127011

(51) Int. Cl.
*G02F 1/167* (2019.01)
*G02F 1/1676* (2019.01)
*G09G 3/34* (2006.01)

(52) U.S. Cl.
CPC ............ *G02F 1/167* (2013.01); *G02F 1/1676* (2019.01); *G09G 3/344* (2013.01)

(58) Field of Classification Search
None
See application file for complete search history.

(56) References Cited

U.S. PATENT DOCUMENTS

| | | | | |
|---|---|---|---|---|
| 8,040,460 B1* | 10/2011 | Shinn | ...................... | G02F 1/167 349/56 |
| 8,730,151 B2* | 5/2014 | Jung | ...................... | B41J 2/04578 345/173 |
| 2004/0085618 A1* | 5/2004 | Kawai | ...................... | G02F 1/167 359/296 |
| 2012/0320446 A1* | 12/2012 | Shinn | ...................... | G02F 1/1677 445/24 |
| 2013/0082942 A1* | 4/2013 | Yu | ...................... | G02F 1/167 345/173 |
| 2018/0074623 A1* | 3/2018 | Xi | ...................... | G06F 3/046 |
| 2019/0285962 A1* | 9/2019 | Zhang | ................. | G02F 1/16766 |
| 2022/0121079 A1* | 4/2022 | Luo | ...................... | G02F 1/167 |
| 2022/0252955 A1* | 8/2022 | Hua | ...................... | G02F 1/167 |

FOREIGN PATENT DOCUMENTS

CN 114724521 A * 7/2022
EP 1000741 A2 * 5/2000 ............ B41J 3/4076

* cited by examiner

*Primary Examiner* — Fred Tzeng
(74) *Attorney, Agent, or Firm* — JCIPRNET (57) ABSTRACT

An electronic paper carrier includes an electrode layer disposed on the electrode layer, an electronic ink layer, a protective layer covering the electronic ink layer, and at least one contact electrode connected with the electrode layer and penetrating the electronic ink layer and the protective layer to be exposed on a surface of the protective layer facing away from the electronic ink layer. An image update machine is configured to update a display image of the electronic paper carrier and includes a transistor array substrate including a plurality of pixel electrodes and an electric field guiding layer covering the pixel electrodes and configured to be in detachable contact with the protective layer and to guide an electric field between the pixel electrodes and the electrode layer. The electric field drives the electronic ink layer to update the display image.

12 Claims, 8 Drawing Sheets

ELECTRONIC PAPER CARRIER AND IMAGE UPDATE MACHINE

CROSS-REFERENCE TO RELATED APPLICATION

This application claims the priority benefit of Taiwanese application no. 111127011, filed on Jul. 19, 2022. The entirety of the above-mentioned patent application is hereby incorporated by reference herein and made a part of this specification.

BACKGROUND

Technical Field

The disclosure relates to an electronic paper. In particular, the disclosure relates to an electronic paper carrier and an image update machine.

Description of Related Art

An electronic paper generates a display image by employing electrophoretic particles that reflect light or absorb light presented in different distributions. Therefore, the electronic paper generates strong light that damages eyes less than liquid crystal displays with backlight and self-luminous organic light-emitting diode displays.

In addition, when an electrode is applied with a voltage, the electrode applies an electric field to electrophoretic particles to change distribution of the electrophoretic particles. After that, the distribution of the electrophoretic particles may be maintained when the electrode is no longer applied with a voltage. Therefore, the electronic paper may save power more than liquid crystal displays and organic light-emitting diode displays.

The structure of an electronic paper is generally divided into an upper electronic ink display layer and a lower thin film transistor array (TFT array) driving layer. The cost of conventional electronic paper is excessively high due to the requirements to be sold to consumers together with the thin film transistor array driving layer below, while the thin film transistor driving layer accounts for more than 80% of the entire cost of the electronic paper.

SUMMARY

The disclosure provides an electronic paper carrier with relatively low cost and good image update.

The disclosure provides an image update machine that can perform good image update for an electronic paper carrier.

An embodiment of the disclosure proposes an electronic paper carrier including an electrode layer, an electronic ink layer, a protective layer, and at least one contact electrode. The electronic ink layer is disposed on the electrode layer. The protective layer covers the electronic ink layer. The at least one contact electrode is connected with the electrode layer and penetrates the electronic ink layer and the protective layer to be exposed on a surface of the protective layer facing away from the electronic ink layer.

An embodiment of the disclosure proposes an image update machine configured to update a display image of an electronic paper carrier. The image update machine includes a transistor array substrate and an electric field guiding layer. The transistor array substrate includes a plurality of pixel electrodes arranged into an array. The electric field guiding layer covers the pixel electrodes and is configured to be in detachable contact with a protective layer of the electronic paper carrier. The electric field guiding layer is configured to guide an electric field between the pixel electrodes of the image update machine and an electrode layer of the electronic paper carrier. The electric field drives an electronic ink layer of the electronic paper carrier to update the display image. The electronic ink layer is located between the electrode layer and the pixel electrodes when the display image is updated.

In the electronic paper carrier and the image update machine according to the embodiments of the disclosure, since the transistor array substrate is located in the image update machine instead of the electronic paper carrier, the cost of the electronic paper carrier may be relatively low. The user does not need to place the electronic paper carrier on the image update machine to update the display image before the user has the need for updating the display image of the electronic paper carrier. Therefore, low cost and good convenience in use can be achieved. Moreover, since the electric field guiding layer is employed to guide the electric field between the pixel electrodes of the image update machine and the electrode layer of the electronic paper carrier, the electronic paper carrier can have good display image update and good image quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
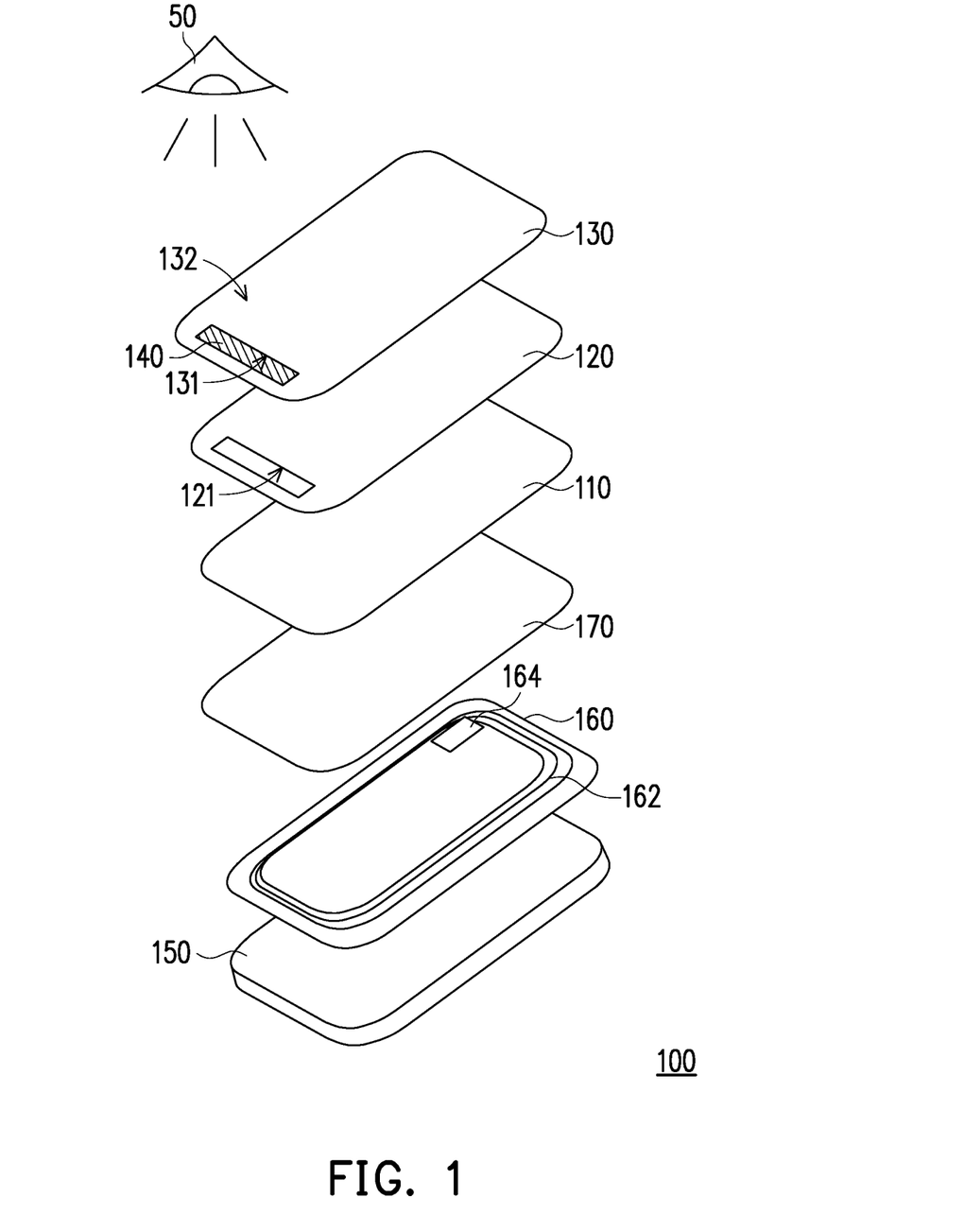
FIG. 1 is a schematic exploded view of an electronic paper carrier according to an embodiment of the disclosure.

FIG. 1 is a schematic exploded view of an electronic paper carrier according to an embodiment of the disclosure, FIG. 2A to FIG. 2E are schematic cross-sectional views showing the process of placing the electronic paper carrier of FIG. 1 into an image update machine to update a display image. With reference to FIG. 1 and FIG. 2A to FIG. 2E, an electronic paper carrier 100 of this embodiment includes an electrode layer 110, an electronic ink layer 120, a protective layer 130, and at least one contact electrode 140 (one contact electrode 140 taken as an example in FIG. 1). The electronic ink layer 120 is disposed on the electrode layer 110. The protective layer 130 covers the electronic ink layer 120. The contact electrode 140 is connected with the electrode layer 110, and penetrates the electronic ink layer 120 and the protective layer 130. For example, the contact electrode 140 penetrates an opening 121 of the electronic ink layer 120 and an opening 131 of the protective layer 130 to be exposed on a surface 132 of the protective layer 130 facing away from the electronic ink layer 120. The material of the contact electrode 140 may be an anti-oxidative electrode material or a material surface-treated with anti-oxidation, for example, indium tin oxide or other conductive metal oxides, to prevent further oxidation and loss of conductive properties of the contact electrode 140 after a period of use.

In this embodiment, a plurality of capsule structures are in the electronic ink layer 120, and electrophoretic particles of different colors (e.g., black, white, red, green, blue, or other colors) are in the capsule structures, providing a display image by electrophoretic display. In this embodiment, since the electronic paper carrier 100 does not include an expensive thin film transistor array, the cost of the electronic paper carrier 100 is relatively low. When the display image of the electronic paper carrier 100 is required to be updated, the electronic paper carrier 100 may be placed into an image update machine 200 (as shown in FIG. 2C).

The image update machine 200 of this embodiment is configured to update the display image of the electronic paper carrier 100. The image update machine 200 includes a transistor array substrate 300 and an electric field guiding layer 210. In this embodiment, the transistor array substrate 300 is a thin film transistor array substrate, for example. The transistor array substrate 300 includes a plurality of pixel electrodes 310 arranged into an array (FIG. 2B to FIG. 2D showing one pixel electrode 310 as an example, with other pixel electrodes represented by three dots to indicate a plurality of pixel electrodes 310). Voltage changes of the pixel electrodes 310 are respectively controlled by a plurality of transistors (e.g., thin film transistors) 330. In other words, the pixel electrodes 310 are electrically connected respectively with the transistors 330. The electric field guiding layer 210 covers the pixel electrodes 310 and is configured to be in detachable contact with the protective layer 130 of the electronic paper carrier 100. In an embodiment, the electric field guiding layer 210 has a low viscosity to the protective layer 130. The electric field guiding layer 210 may be attached to the protective layer 130, and may be easily separated from the protective layer 130. In this embodiment, the electric field guiding layer 210 includes a silicon material, a polyester film, or a fluorine film. In addition, in an embodiment, the pixel electrodes 310 are covered by a protective layer 340, and the electric field guiding layer 210 covers the protective layer 340.

The electric field guiding layer 210 is configured to guide an electric field between the pixel electrodes 310 of the image update machine 200 and the electrode layer 110 of the electronic paper carrier 100. The electric field drives the electronic ink layer 120 of the electronic paper carrier 100 to update the display image. When the display image is updated, the electronic ink layer 120 is located between the electrode layer 110 and the pixel electrodes 310, and is affected by the electric field between the electrode layer 110 and the pixel electrodes 310 to change distribution of the electrophoretic particles of different colors in the electronic ink layer 120.

In this embodiment, the transistor array substrate 300 further includes a common electrode 320, and the image update machine 200 further includes an elastic conductor 220. When the display image is updated, the common electrode 320 and the contact electrode 140 of the electronic paper carrier 100 press the elastic conductor 220 to conduct the common electrode 320 with the contact electrode 140, and the contact electrode 140 is connected with the electrode layer 110. In this embodiment, the elastic conductor 220 includes a conductive foam tape, a conductive silicone, or a conductive non-woven fabric.

In this embodiment, the image update machine 200 further includes a first magnetic platen 230 and a second magnetic platen 240. The first magnetic platen 230 carries the transistor array substrate 300 and the electric field guiding layer 210, and the second magnetic platen 240 is configured to carry the electronic paper carrier 100. When the display image is updated, the transistor array substrate 300 and the electronic paper carrier 100 are located between the first magnetic platen 230 and the second magnetic platen 240, and the first magnetic platen 230 and the second magnetic platen 240 attract each other, such that the common electrode 320 and the contact electrode 140 press the elastic conductor 220, and the electric field guiding layer 210 is in contact with the protective layer 130. In this embodiment, the materials of the first magnetic platen 230 and the second magnetic platen 240 are magnets or other magnetic substances, for example. Nonetheless, in other embodiments, the first magnetic platen 230 and the second magnetic platen 240 may also be electromagnets.

In this embodiment, as shown in FIG. 1, the electronic paper carrier 100 further includes a card substrate 150, and the electrode layer 110 is located between the electronic ink layer 120 and the card substrate 150. In addition, in this embodiment, the electronic paper carrier 100 further includes an antenna layer 160 and a double-sided tape 170. The antenna layer 160 is disposed between the electrode layer 110 and the card substrate 150. The double-sided tape 170 is disposed between the electrode layer 110 and the antenna layer 160, and is attached to the electrode layer 110 and the antenna layer 160. The antenna layer 160 may include an antenna 162 and an integrated circuit (IC) 164 electrically connected with the antenna 162. Therefore, the card substrate 150 and the antenna layer 160 may serve as a wireless radio frequency identification card (RFID card). The front side of this card may provide the display image through the electronic ink layer 120.

In the electronic paper carrier 100 and the image update machine 200 of this embodiment, since the transistor array substrate 300 is located in the image update machine 200 instead of the electronic paper carrier 100, the cost of the electronic paper carrier 100 may be relatively low. A user does not need to place the electronic paper carrier 100 on the image update machine 200 to update the display image before the user has the need for updating the display image of the electronic paper carrier 100. Therefore, low cost and good convenience in use can be achieved. Moreover, since the electric field guiding layer 210 is employed to guide the electric field between the pixel electrodes 310 of the image update machine 200 and the electrode layer 110 of the electronic paper carrier 100, the electronic paper carrier 100 can have good display image update and good image quality.

Figure 2A:
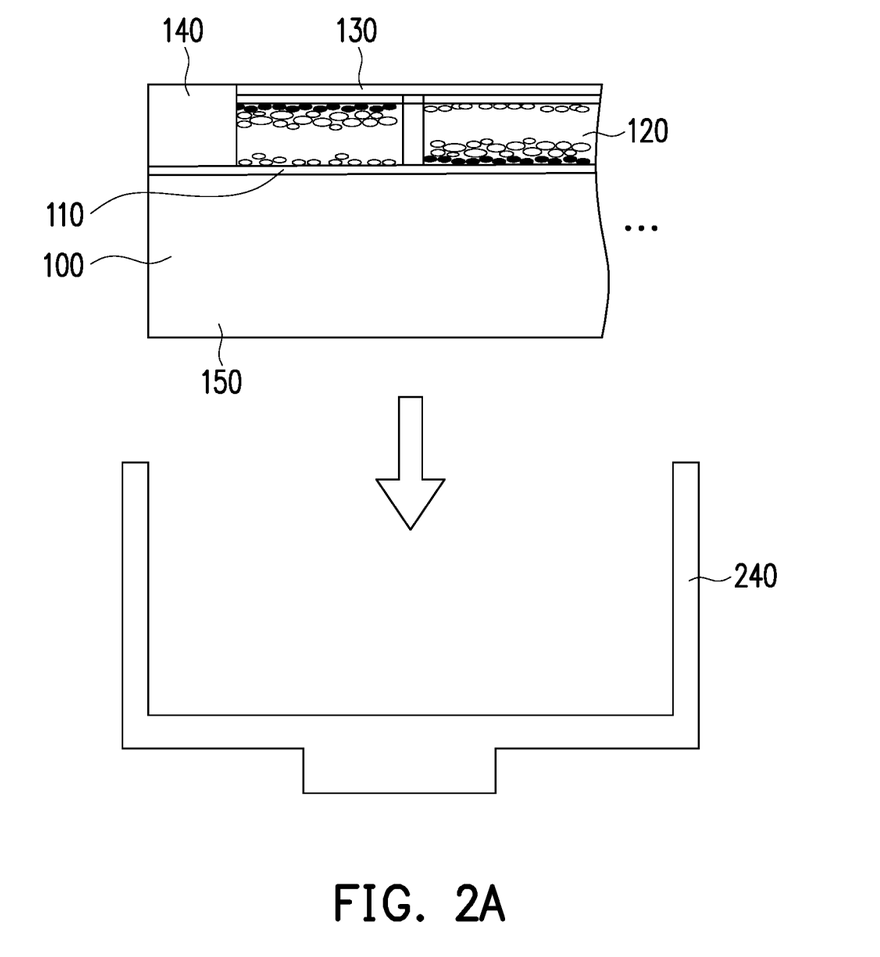
FIG. 2A to FIG. 2E are schematic cross-sectional views showing the process of placing the electronic paper carrier of FIG. 1 into an image update machine to update a display image.
Figure 2B:
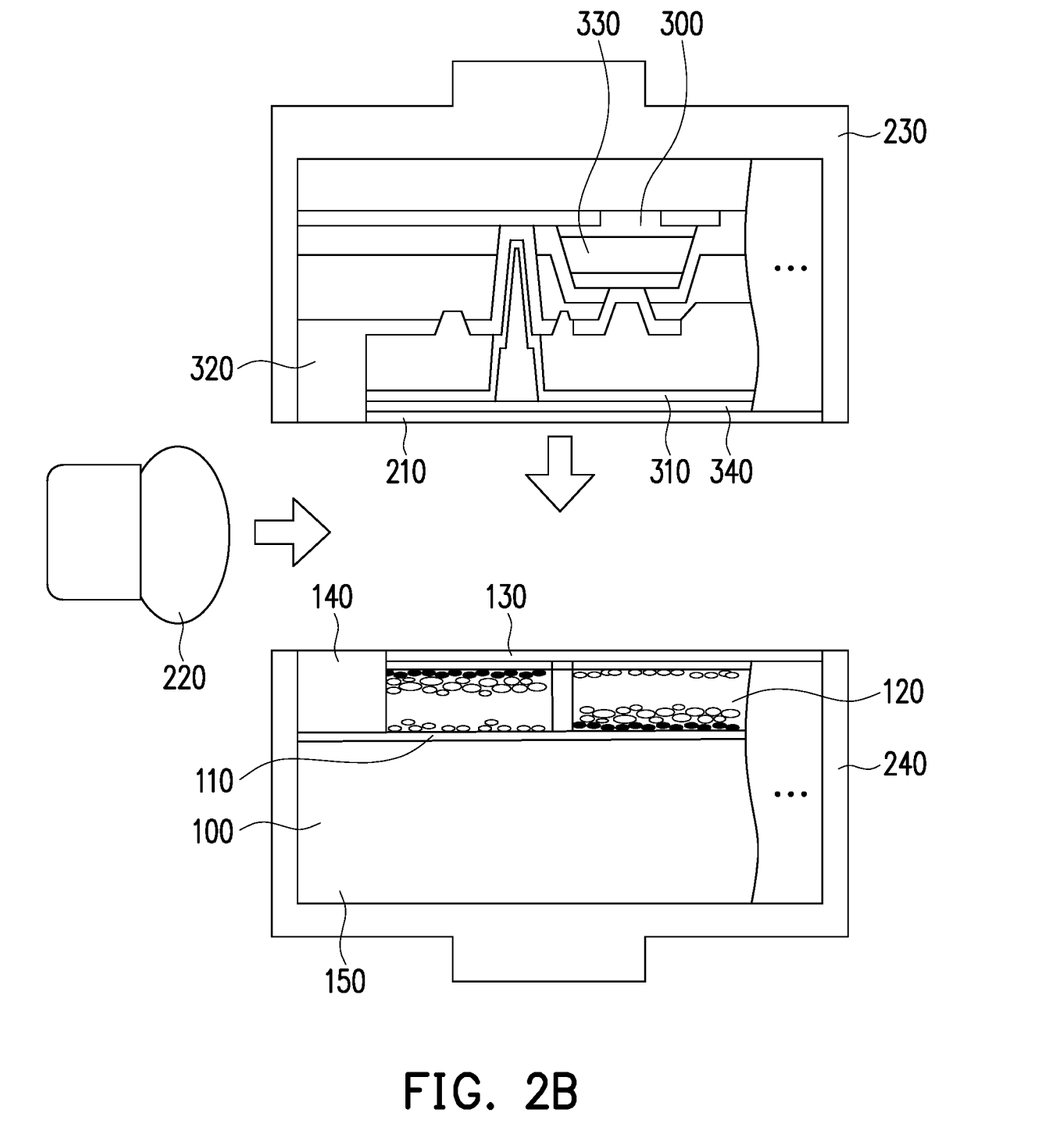
Figure 2C:
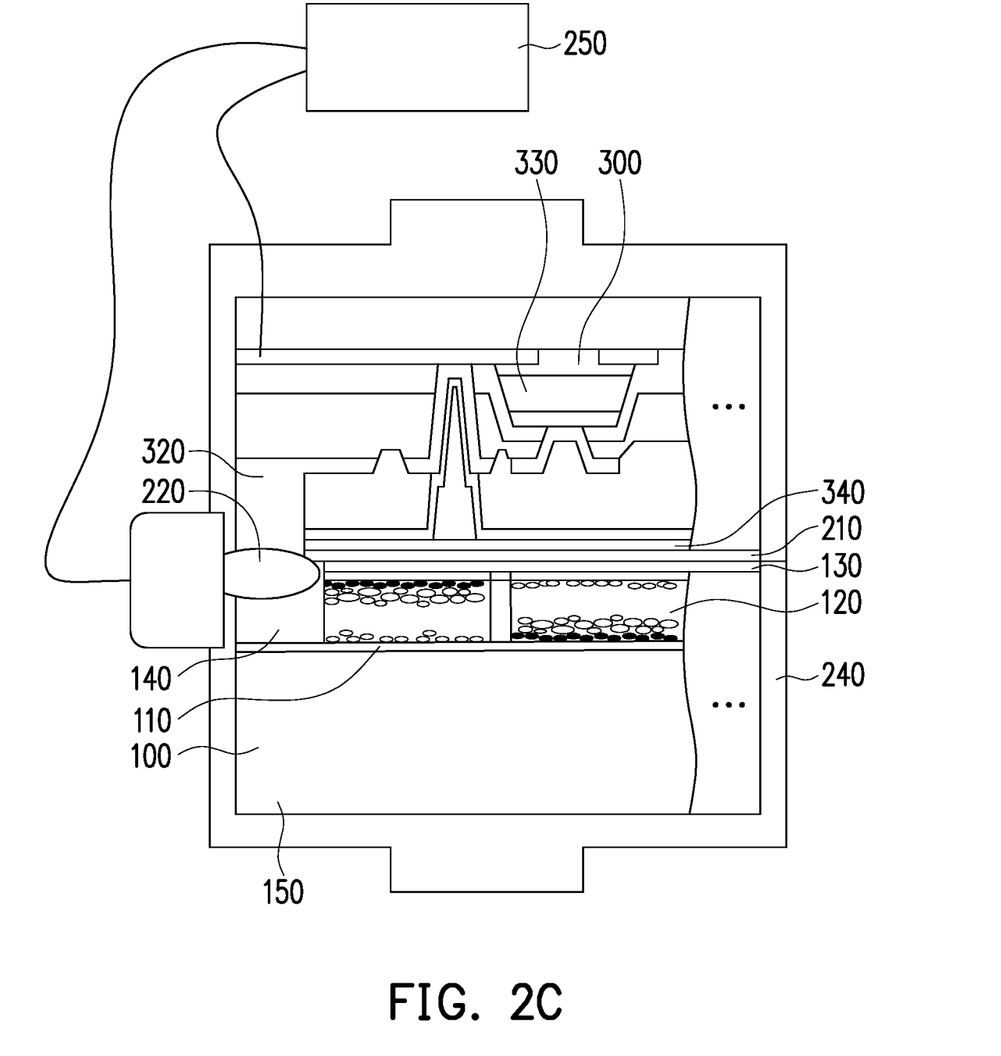
Figure 2D:
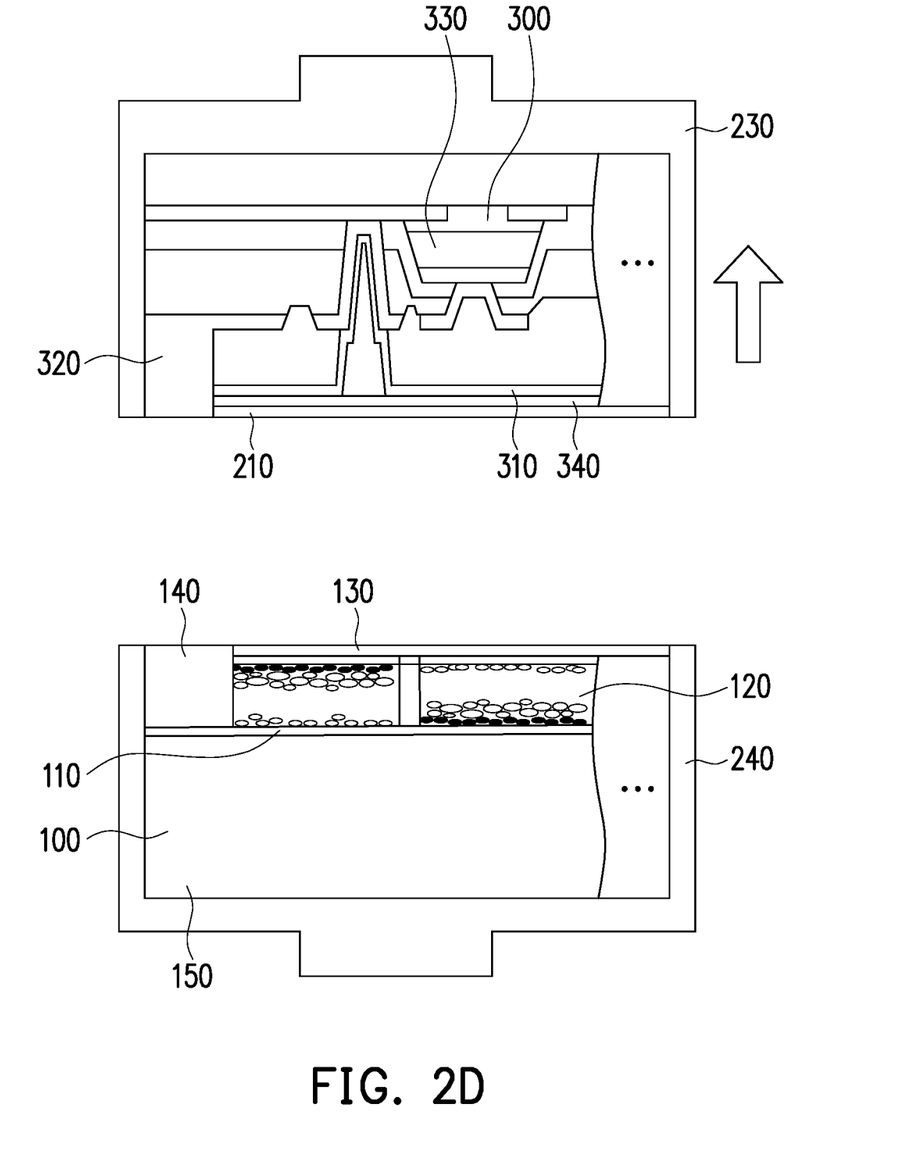

When a user intends to update the display image of the electronic paper carrier 100, with reference to FIG. 2A, the user may first place the electronic paper carrier 100 into the second magnetic platen 240. Next, as shown in FIG. 2B, the first magnetic platen 230, the second magnetic platen 240, and the elastic conductor 220 are to be combined. Then, as shown in FIG. 2C, the first magnetic platen 230 and the second magnetic platen 240 press the transistor array substrate 300 to be combined with the electronic paper carrier 100 and the elastic conductor 220 due to the magnetic attraction. At this time, the common electrode 320 and the contact electrode 140 press the elastic conductor 220, and the electric field guiding layer 210 is in contact with the protective layer 130. In addition, at this time, the driving circuit plate 250 applies a voltage difference between a drain (or a source) of the transistors 330 and the elastic conductor 220. Moreover, the transistors 330 may control the voltage changes of the pixel electrodes 310, such that the electric field generated between the electrode layer 110 and the pixel electrodes 310 changes the distribution of the electrophoretic particles in the electronic ink layer 120 to change the display image provided by the electronic ink layer 120.

In this embodiment, since the magnetic attraction force between the first magnetic platen 230 and the second magnetic platen 240 is employed to fix the positions of the transistor array substrate 300 and the electronic paper carrier 100, precision in alignment between the electronic paper carrier 100 and the transistor array substrate 300 can be effectively improved, so as to improve accuracy and quality of the display image of the electronic paper carrier 100.

Figure 2E:
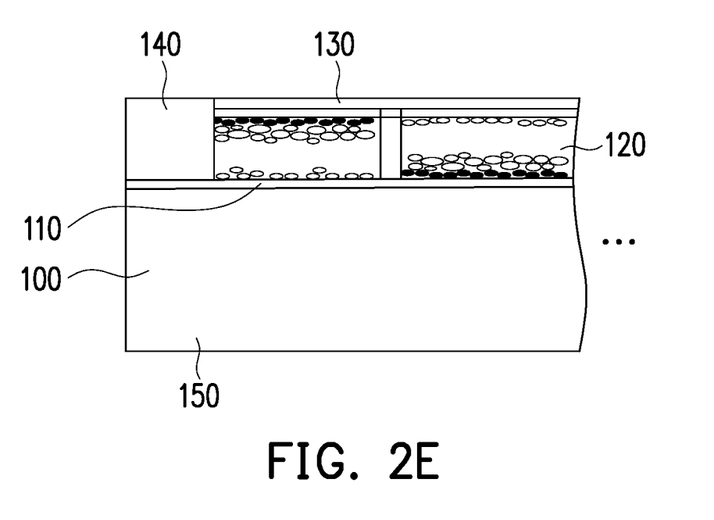

After the display image is updated, as shown in FIG. 2D, the first magnetic platen 230 and the second magnetic platen 240 are separated. Lastly, as shown in FIG. 2E, the electronic paper carrier 100 is removed from the second magnetic platen 240.

In an embodiment, the electronic paper carrier 100 may serve as a stored-value inductive ticket for taking public transportation, and the image update machine 200 may be integrated with a recharge machine. When a user use the electronic paper carrier 100 to take public transportation, the user may bring the electronic paper carrier 100 close to the cash dispenser, and induction is generated through wireless radio frequency identification between the cash dispenser and the antenna 162 of the electronic paper carrier 100 to rewrite the amount of stored values in the integrated circuit 164. When a user intends to recharge the electronic paper carrier 100, the user may place the electronic paper carrier 100 into the recharge machine. The recharge machine is induced through wireless radio frequency identification with the antenna 162 of the electronic paper carrier 100 to rewrite the amount of stored values in the integrated circuit 164 of the electronic paper carrier 100. The user may choose to update the display image of the electronic paper carrier 100 at the same time during the recharging. Since the image update machine 200 is integrated with the recharge machine, the display image of the electronic paper carrier 100 may also be updated through the steps of FIG. 2A to FIG. 2E. Accordingly, the electronic paper carrier 100 may become a stored-value inductive ticket with a changeable pattern. The company of the stored-value inductive ticket may also charge the user for providing the screen update services.

Alternatively, in another embodiment, the electronic paper carrier 100 may serve as a hotel room card. When a user checks in at a hotel, the counter staff may place the electronic paper carrier 100 into the image update machine 200 to display the room number, notices, and service notes for the guest on the electronic paper carrier 100. When the user taking the electronic paper carrier 100 intends to enter the room, since the electronic paper carrier 100 includes the wireless radio frequency identification antenna 162, the door may be unlocked through induction with the sensor. When the user checks out at the counter, the counter staff may display a photo on the electronic paper carrier 100 through the image update machine 200, such that the electronic paper carrier 100 may serve as a commemorative card for the user to take away.

Alternatively, in yet another embodiment, the electronic paper carrier 100 may serve as a ticket to an art gallery, a museum, or an amusement park. The electronic paper carrier 100 may display the map in the venue through the image update machine 200. The wireless radio frequency identification antenna 162 of the electronic paper carrier 100 may be sensed by the machine, allowing a user to pass through the entrance of the venue. In addition, some image update machines 200 may be made in the shape of a stamp, and may apply a voltage to a drain (or a source) of the common electrode 320 and the transistors 330 through a built-in battery to achieve stamp at the site. Before the user leaves, the image of the electronic paper carrier 100 may be updated through the image update machine 200 into a image of a painting, a photo, or a work of art for the user to take away as a souvenir.

Alternatively, in still another embodiment, the electronic paper carrier 100 may serve as an access card to an office building, and the image update machine 200 may serve as a self-service card issuing machine. When a user arrives at the entrance of the office building, the user may operate the self-service card issuing machine (i.e., the image update machine 200) to obtain an access card (i.e., the electronic paper carrier 100) that displays information such as the place to be visited, the time of visiting, and the visitor's name. The wireless radio frequency identification antenna 162 of the electronic paper carrier 100 may be sensed by the machine, and the door security may be unlocked to allow the user to enter the office building. Before the user leaves the office building, the electronic paper carrier 100 may be recycled for reuse.

Figure 3A:
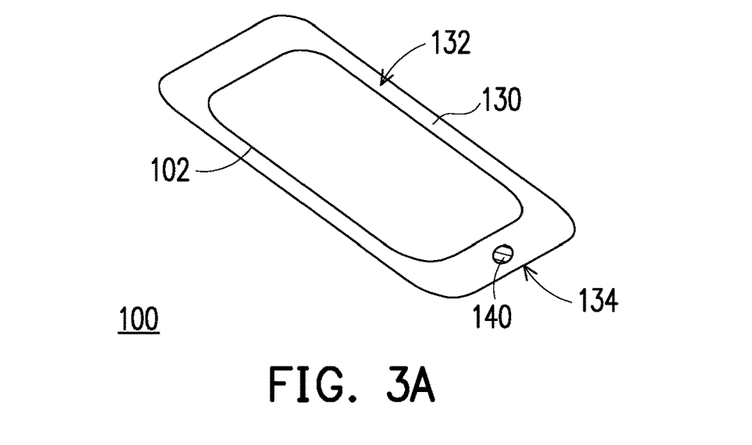
FIG. 3A, FIG. 3B, and FIG. 3C respectively show three examples of the front side of the electronic paper carrier of FIG. 1.
Figure 3B:
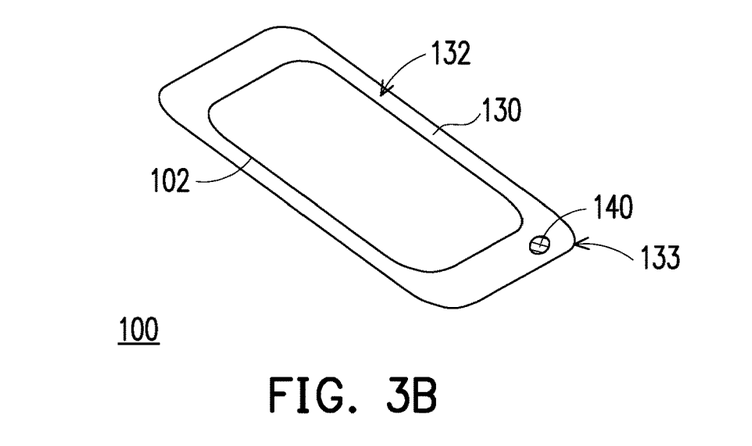
Figure 3C:
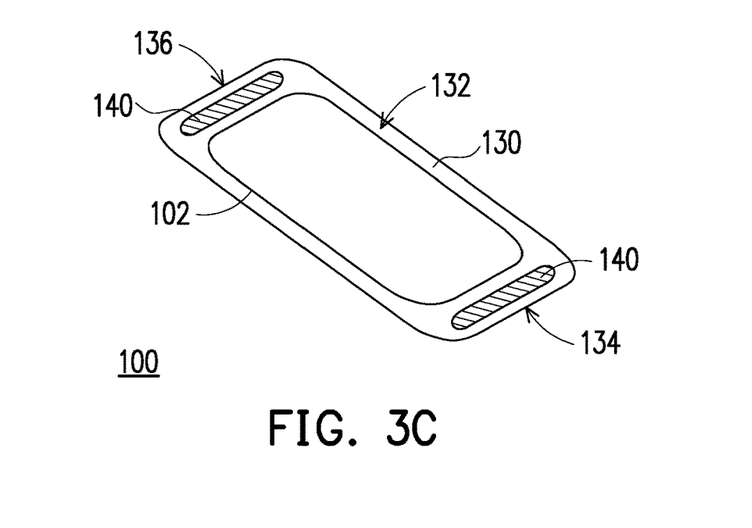

FIG. 3A, FIG. 3B, and FIG. 3C respectively show three examples of the front side of the electronic paper carrier of FIG. 1. With reference to FIG. 3A, the contact electrode 140 may be located at a position close to an edge 134 of the protective layer 130, for example, located at one side of a display region 102 of the electronic paper carrier 100. A user may see the display image generated by the electrophoretic particles of the electronic ink layer 120 in the display region 102. The example of FIG. 3A may be applied to an electronic paper carrier 100 of a small size. With reference to FIG. 3B, the contact electrode 140 may also be located at a position close to a corner 133 of the protective layer 130. The example of FIG. 3B may be applied to an electronic paper carrier 100 of a small or medium size. Alternatively, with reference to FIG. 3C, the electronic paper carrier 100 may also include two contact electrodes 140. The two contact electrodes 140 are respectively located at positions close to two opposite edges 134 and 136 of the protective layer 130. The two contact electrodes 140 may both be connected with the electrode layer 110 to provide a relatively uniform voltage distribution of the electrode layer 110. This case is applicable to an electronic paper carrier 100 of a relatively large size.

Figure 4:
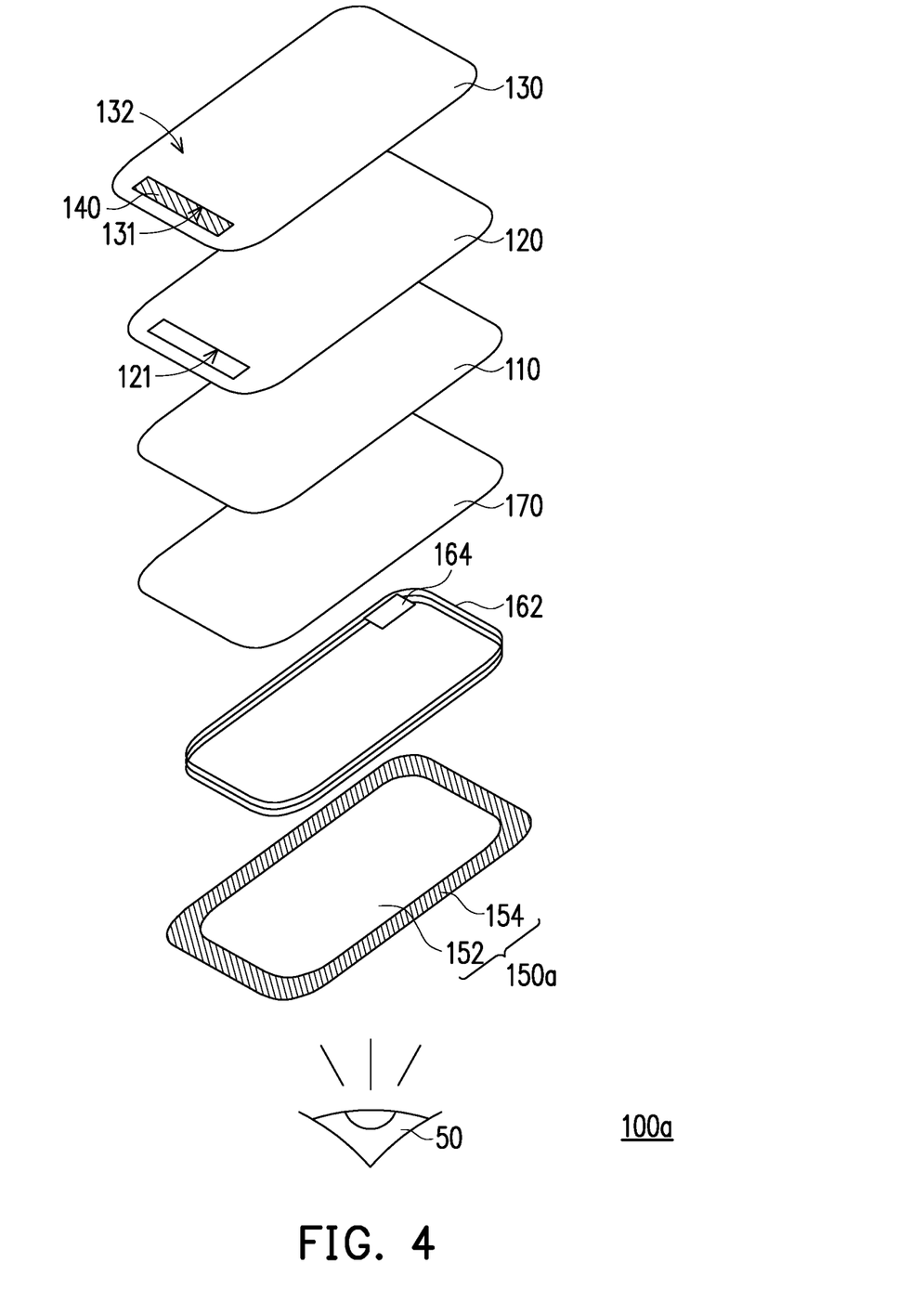
FIG. 4 is a schematic exploded view of an electronic paper carrier according to another embodiment of the disclosure.

FIG. 4 is a schematic exploded view of an electronic paper carrier according to another embodiment of the disclosure. With reference to FIG. 4, an electronic paper carrier 100a of this embodiment is similar to the electronic paper carrier 100 of FIG. 1, and their differences between are described as follows. For the electronic paper carrier 100 of FIG. 1, eyes 50 of a user can see the display image provided by the electronic ink layer 120 on the front side of the electronic paper carrier 100 through the protective layer 130. Comparatively, in this embodiment, the eyes 50 of the user can see the display image provided by the electronic ink layer 120 on the back side of the electronic paper carrier 100a. Specifically, in the electronic paper carrier 100a of this embodiment, a card substrate 150a includes a light transmitting part 152 and a light shielding part 154 surrounding the light transmitting part 152. The electrode layer 110 is a transparent conductive layer, and the material thereof may be indium tin oxide (ITO) or other transparent conductive materials. A display content of the electronic ink layer 120 is visible to the eyes 50 of the user from an outside through the light transmitting part 152 and the transparent conductive layer (i.e., the electrode layer 110).

In this embodiment, the antenna 162 is disposed between the light shielding part 154 and the transparent conductive layer 110. The double-sided tape 170 is disposed between the transparent conductive layer 110 and the antenna 162, and disposed between the transparent conductive layer 110 and the light transmitting part 152. Therefore, when viewed by the eyes 50 of the user from the back side of the electronic paper carrier 100a, the antenna 162 is shielded by the light shielding part 154 and thus cannot be seen. Accordingly, the appearance of the electronic paper carrier 100a can be beautified. In addition, the integrated circuit 164 electrically connected with the antenna 162 may also be disposed between the light shielding part 154 and the transparent conductive layer 110 to be unobservable to the eyes 50 of the user.

In summary of the foregoing, in the electronic paper carrier and the image update machine according to the embodiments of the disclosure, since the transistor array substrate is located in the image update machine instead of the electronic paper carrier, the cost of the electronic paper carrier may be relatively low. The user does not need to place the electronic paper carrier on the image update machine to update the display image before the user has the need for updating the display image of the electronic paper carrier. Therefore, low cost and good convenience in use can be achieved. Moreover, since the electric field guiding layer is employed to guide the electric field between the pixel electrodes of the image update machine and the electrode layer of the electronic paper carrier, the electronic paper carrier can have good display image update and good image quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic paper carrier comprising:
    an electrode layer;
    an electronic ink layer disposed on the electrode layer;
    a protective layer covering the electronic ink layer; and
    at least one contact electrode connected with the electrode layer and penetrating the electronic ink layer and the protective layer to be exposed on a surface of the protective layer facing away from the electronic ink layer.

2. The electronic paper carrier according to claim 1, further comprising a card substrate, wherein the electrode layer is located between the electronic ink layer and the card substrate.

3. The electronic paper carrier according to claim 2, further comprising:
    an antenna layer disposed between the electrode layer and the card substrate; and
    a double-sided tape disposed between the electrode layer and the antenna layer, and attached to the electrode layer and the antenna layer.

4. The electronic paper carrier according to claim 2, wherein the card substrate has a light transmitting part and a light shielding part surrounding the light transmitting part, the electrode layer is a transparent conductive layer, and a display content of the electronic ink layer is visible to a user from an outside through the light transmitting part and the transparent conductive layer.

5. The electronic paper carrier according to claim 4, further comprising:
    an antenna disposed between the light shielding part and the transparent conductive layer; and
    a double-sided tape disposed between the transparent conductive layer and the antenna, and disposed between the transparent conductive layer and the light transmitting part.

6. The electronic paper carrier according to claim 1, wherein the at least one contact electrode is located at a position close to an edge or a corner of the protective layer.

7. The electronic paper carrier according to claim 1, wherein the at least one contact electrode comprises two contact electrodes, and the two contact electrodes are respectively located at positions close to two opposite edges of the protective layer.

8. An image update machine configured to update a display image of an electronic paper carrier, the image update machine comprising:
    a transistor array substrate comprising a plurality of pixel electrodes arranged into an array; and
    an electric field guiding layer covering the pixel electrodes and configured to be in detachable contact with a protective layer of the electronic paper carrier, wherein the electric field guiding layer is configured to guide an electric field between the pixel electrodes of the image update machine and an electrode layer of the electronic paper carrier, and the electric field drives an electronic ink layer of the electronic paper carrier to update the display image, wherein the electronic ink layer is located between the electrode layer and the pixel electrodes when the display image is updated, and the electric field guiding layer comprises a silicon material, a polyester film, or a fluorine film.

9. The image update machine according to claim 8, wherein the transistor array substrate further comprises a common electrode, and the image update machine further comprises an elastic conductor, wherein the common electrode and a contact electrode of the electronic paper carrier press the elastic conductor to conduct the common electrode with the contact electrode when the display image is updated, wherein the contact electrode is connected with the electrode layer.

10. The image update machine according to claim 9, further comprising:
    a first magnetic platen carrying the transistor array substrate and the electric field guiding layer; and
    a second magnetic platen configured to carry the electronic paper carrier, wherein when the display image is updated, the transistor array substrate and the electronic paper carrier are located between the first magnetic platen and the second magnetic platen, and the first magnetic platen and the second magnetic platen attract each other, such that the common electrode and the contact electrode press the elastic conductor, and the electric field guiding layer is in contact with the protective layer.

11. The image update machine according to claim 9, wherein the elastic conductor comprises a conductive foam tape, a conductive silicone, or a conductive non-woven fabric.

12. The image update machine according to claim 8, wherein the transistor array substrate is a thin film transistor array substrate.

\* \* \* \* \*